Figure 4:
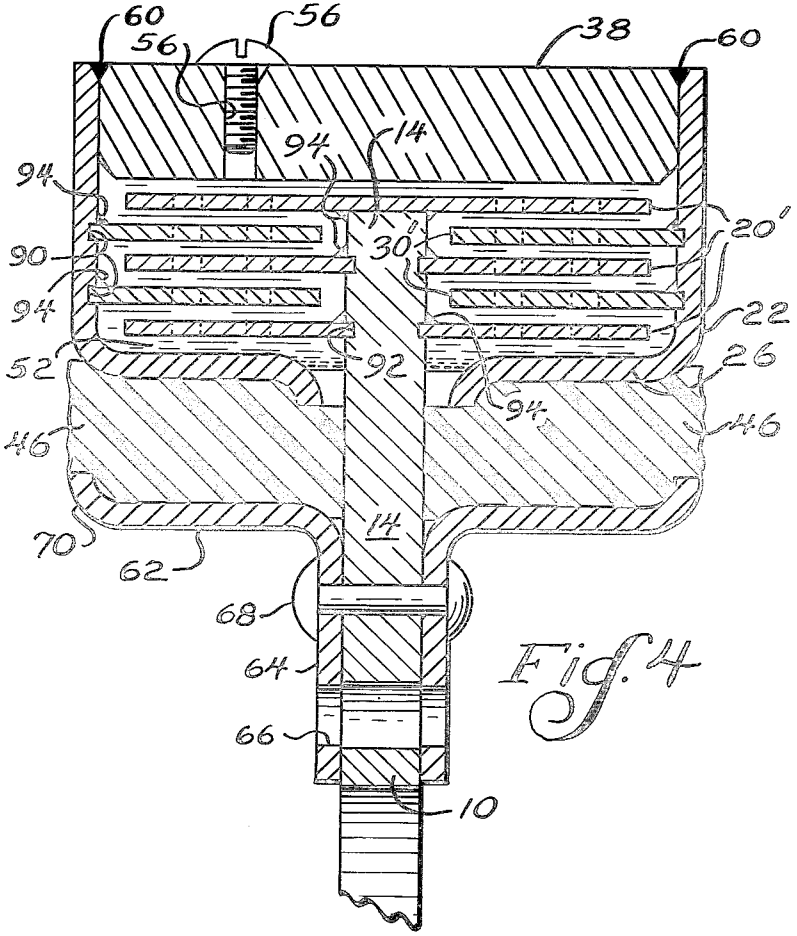
Figure 3:
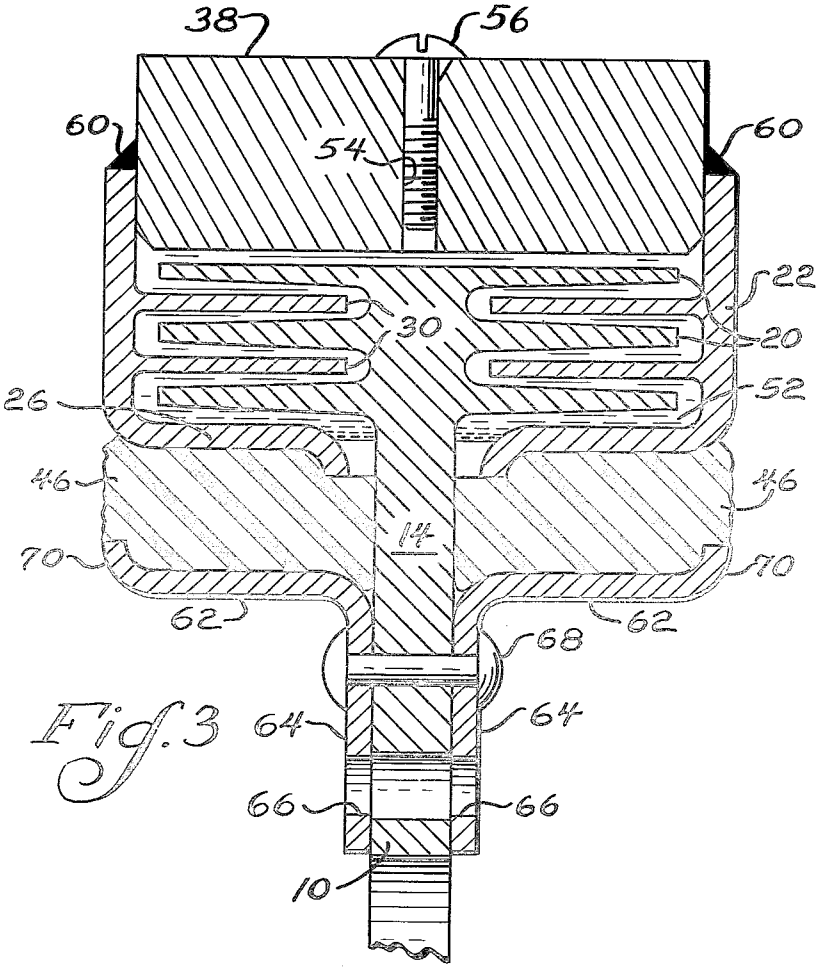

United States Defensive Publication [19] (H) [11] T973,005

Shyu et al. [43] Aug. 1, 1978

[54] TUNED VISCOUS DAMPER

[75] Inventors: Tsu Pin Shyu, Peoria; Byron H. Lofquist, Creve Coeur, both of Ill.

[73] Assignee: Caterpillar Tractor Co., Peoria, Ill.

[21] Appl. No.: 850,893

[22] Filed: Nov. 9, 1977

Related U.S. Application Data

[63] Continuation of Ser. No. 733,485, Oct. 18, 1976.

[51] Int. Cl.[2] ..... F16F 15/00

[52] U.S. Cl. ..... 74/574

[57] ABSTRACT

A tuned viscous damper including a hub adapted to receive a rotational input force, a first element carried by the hub having a plurality of spaced, annular fins directed generally axially of the hub and concentrically therewith, a second element having a plurality of spaced, annular fins directed generally axially of the hub and concentric therewith, the fins on the first element projecting into the spaces between the fins on the second element in noncontacting relation, an annular inertia weight, an annular spring secured to the second means and to one of the inertia weight and the hub, a housing including at least one of the first and second elements, the inertia weight and the annular spring defining a closed chamber encompassing the fins, and a body of viscous liquid at least partially filling the chamber. The first element is a web and carries its fins on both sides thereof. The second element is a housing and comprises two identical parts each having fins thereon with the identical parts being disposed on opposite sides of the web such that the fins thereon are directed toward the web. All of the fins are generally axially extending. The housing and/or the web can be formed of metals having low densities or of metals which are principally ferrous in composition, as desired, to adjust the mass ratio of the damper without changing the geometry of the parts.

8 Claims, 2 Sheets Drawing,

17 Pages Specification

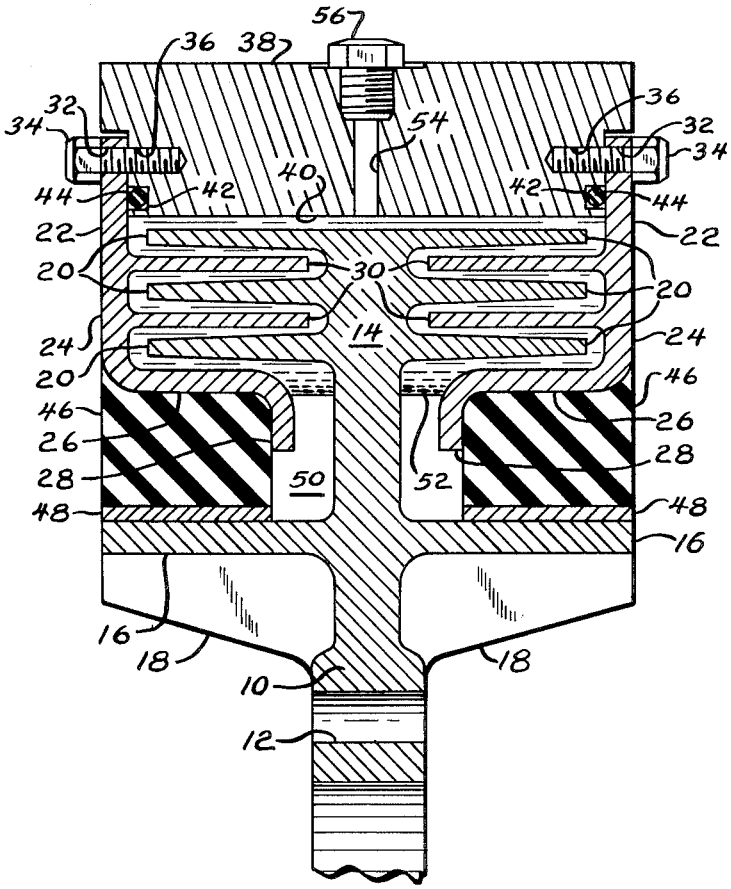

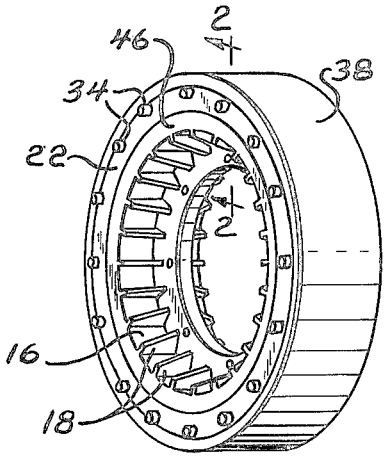
Fig. 1
Fig. 2
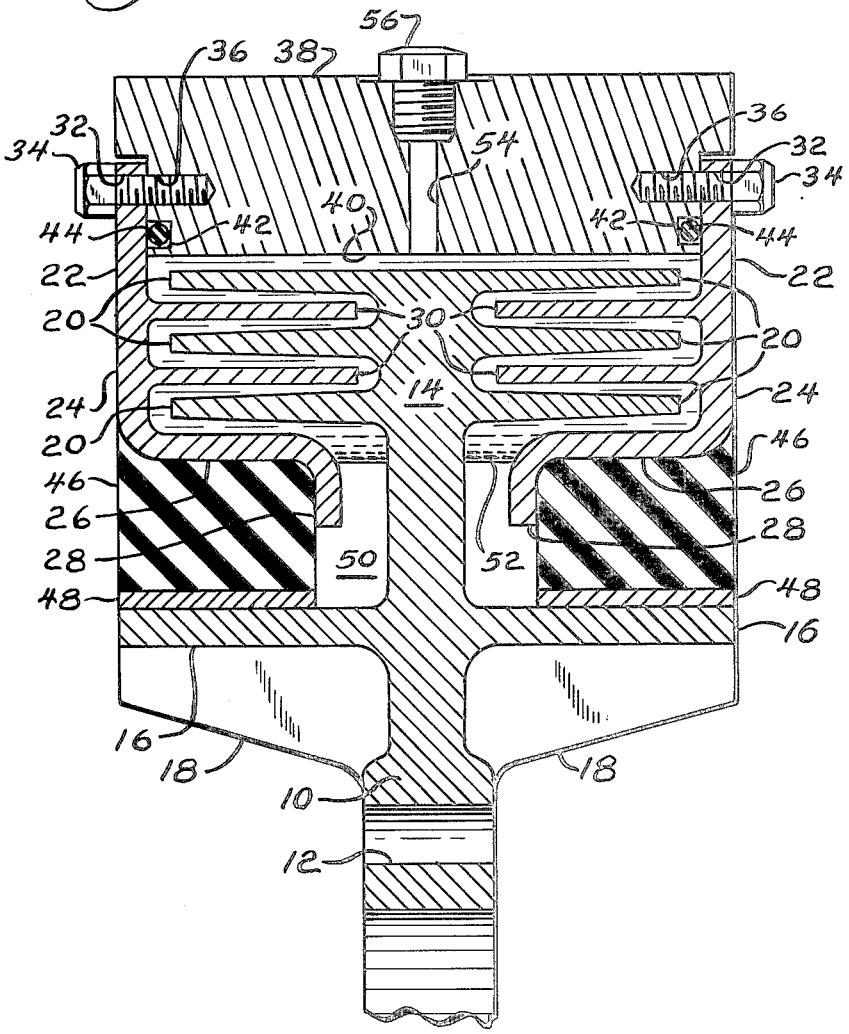

The file of this unexamined application may be inspected and copies thereof may be purchased (849 O.G. 1221, Apr. 9, 1968).